United States Patent [19]

Harris

[11] Patent Number: 4,518,541
[45] Date of Patent: May 21, 1985

[54] LIQUID AERATING APPARATUS

[75] Inventor: Derek W. Harris, Lincolnshire, England

[73] Assignee: Sodastream Limited, Peterborough, England

[21] Appl. No.: 599,610

[22] PCT Filed: Aug. 11, 1983

[86] PCT No.: PCT/GB83/00202
§ 371 Date: Apr. 10, 1984
§ 102(e) Date: Apr. 10, 1984

[87] PCT Pub. No.: WO84/00671
PCT Pub. Date: Mar. 1, 1984

[30] Foreign Application Priority Data

Aug. 20, 1982 [GB] United Kingdom ............... 8224061

[51] Int. Cl.³ ............................................. B01F 3/04
[52] U.S. Cl. ................................. 261/27; 261/50 B; 261/DIG. 7; 261/DIG. 74
[58] Field of Search ...... 261/DIG. 7, 50 B, DIG. 74, 261/27

[56] References Cited

U.S. PATENT DOCUMENTS

| | | | |
|---|---|---|---|
| 3,337,197 | 8/1967 | Iannelli | 261/DIG. 7 |
| 3,552,726 | 1/1971 | Kraft | 261/50 B |
| 3,618,905 | 11/1971 | Primus | 261/DIG. 7 |
| 3,752,452 | 8/1973 | Iannelli | 261/DIG. 7 |
| 3,756,576 | 9/1973 | Tremolada | 261/DIG. 7 |
| 4,187,262 | 2/1980 | Fessler | 261/50 B |
| 4,304,736 | 12/1981 | McMillin et al. | 261/DIG. 7 |

FOREIGN PATENT DOCUMENTS

| | | |
|---|---|---|
| 2035598 | 12/1970 | France . |
| 2084360 | 11/1971 | France . |
| 416038 | 9/1934 | United Kingdom . |
| 1222311 | 2/1971 | United Kingdom . |
| 1560753 | 2/1980 | United Kingdom . |
| 2100228 | 12/1982 | United Kingdom . |

*Primary Examiner*—Tim Miles
*Attorney, Agent, or Firm*—Watson, Cole, Grindle & Watson

[57] ABSTRACT

An apparatus for aerating liquids, particularly for the preparation of carbonated beverages, has a carbonating chamber with electrically actuated valves controlling the flow of liquid and gas to and from the chamber, and a programmed electronic timer control device controls said valves enabling liquid to be carbonated and dispensed at the touch of a button.

15 Claims, 2 Drawing Figures

LIQUID AERATING APPARATUS

This invention concerns apparatus for aerating liquids, and in particular for carbonating water to make fizzy drinks.

The portable carbonating machines currently available for use in the home are entirely mechanically operated. A person using one of these machines is required to perform a series of manual operations in a specified sequence if a satisfactory result is to be achieved. As a result children and persons unfamiliar with this kind of carbonating apparatus can experience difficulty in using the machines. Portable carbonators of the mechanical type are described, for example, in Patent Specification Nos. GB No. 1453363, GB No. 1468469, and GB No. 2026882.

The present invention aims to alleviate the above drawbacks of known portable carbonating machines. A carbonating apparatus according to the invention comprises a carbonating chamber, first valve means for controlling admission of liquid to and discharge of carbonated liquid from the chamber, a gas jet nozzle mounted in the chamber for injecting carbon dioxide gas into liquid contained in the chamber, means for connecting the jet nozzle to a source of pressurized gas including second valve means for controlling the supply of gas, pressure releasing means communicating with an upper part of the chamber and including third valve means, and the apparatus is characterised in that the first, second and third valve means are electrically actuable and controlled by electronic control means which is so programmed that in response to a start signal supplied to the control means, the first valve means is actuated for the admission of liquid to the chamber to substantially fill the chamber, after closure of the first valve means the second valve means is actuated one or more times for periods of set duration for gas to be supplied to the jet nozzle and injected into the liquid, after termination of the gas supply and a short delay the said third valve means is opened to release the pressure in the chamber, and following a further short delay after opening the exhaust valve the first valve means may be actuated for carbonated liquid to be discharged from the chamber. A carbonating apparatus embodying the invention may be of uncomplicated construction and easily arranged to dispense carbonated liquid at the touch of an operating member, such as the press of a button.

According to a particularly expedient embodiment of the invention the control means comprises an electronic timer control device which actuates the first valve means for a predetermined time for admission of liquid into the chamber, and enables the first valve means to be actuated to discharge liquid from the chamber after a predetermined delay has elapsed after opening the third valve means. A timer control device can have the advantage of simplifying the apparatus by avoiding the need for sensor or feedback signals to determine when each stage in the operation has been completed and the next can be commenced. However, means to provide such signals may be desirable and can be included in the apparatus.

In a preferred embodiment of the invention the chamber includes liquid inlet and outlet means at the lower end thereof and means is provided for connecting the inlet means to a source of liquid under pressure, which may be a reservoir and an electrically driven pump, the pump motor being energised under the control of the control means for the pump to be operated for the period during which the inlet valve means is opened. Alternatively, if the reservoir is mounted above the carbonating chamber the head of liquid may be sufficient to allow the pump to be dispensed with, the water then entering the chamber under gravity. Furthermore the reservoir may consist of an enclosed tank and be pressurised by the exhaust gas from the chamber for forcing the liquid from the tank into the chamber.

The apparatus may easily be arranged for still water or carbonated water to be delivered to the dispenser nozzle at the selection of the operator.

The above and other features of the invention will be more fully understood from the following detailed description which is given with reference to the accompanying drawings, in which.

Figure 1:
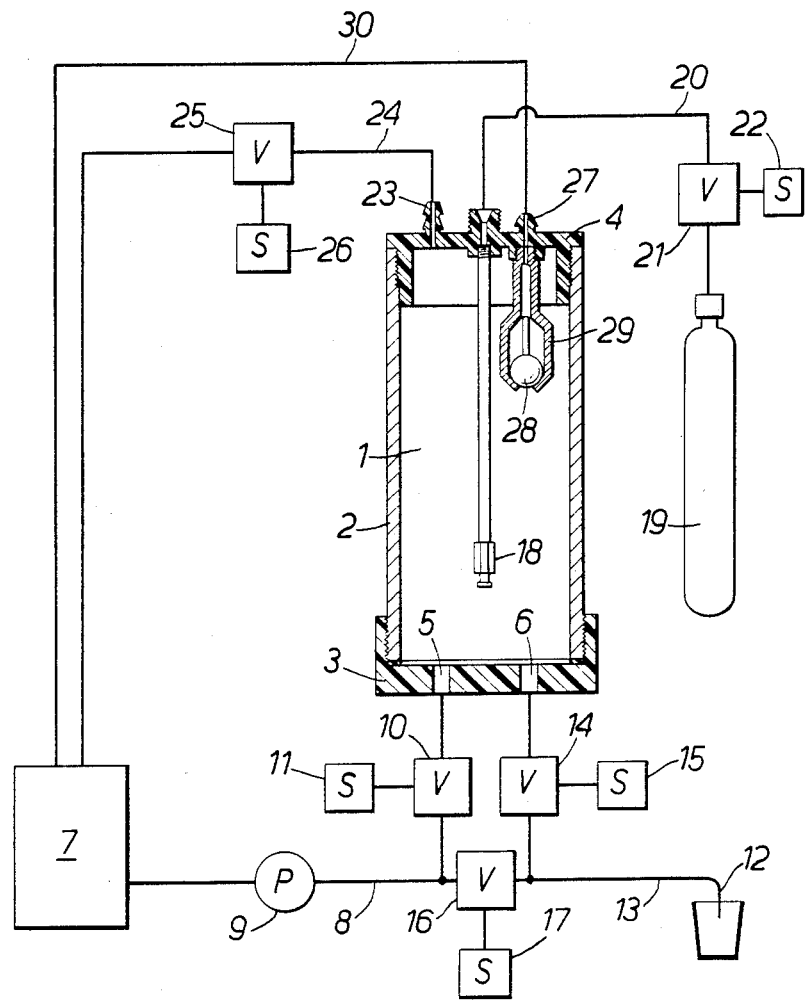
FIG. 1 is a schematic illustration of an apparatus embodying the invention.

The carbonating apparatus shown in the drawing has a carbonating chamber 1 enclosed by a pressure vessel having a cylindrical side wall 2, the lower end of which is screwed into and sealed to a moulded plastics manifold 3, and the upper end of which receives a screw threaded cap 4 also moulded from plastics material. The manifold 3 includes an inlet port 5 and an outlet port 6. The inlet is connected to a water tank 7 through a supply pipe 8 which includes an electrically driven pump 9 and a valve 10 controlled by a solenoid 11. The outlet port 6 is connected to a dispenser nozzle 12 by a discharge pipe 13 which includes a valve 14 controlled by a solenoid 15. Another valve 16 having a control solenoid 17 is connected between the supply pipe 8 on the upstream side of valve 10 and the discharge pipe 13 on the downstream side of valve 14.

Supported in the chamber 1 by the cap 4 is a gas jet nozzle 18 which is connected to a gas cylinder 19 through a gas line 20 which includes a valve 21 controlled by a solenoid 22. An exhaust port 23 provided in the cap 4 communicates with atmosphere via an exhaust pipeline 24 incorporating a pressure relief valve 25 which operates in well known manner to limit the pressure in the chamber 1. The valve 25 is arranged to be also opened upon activating a solenoid 26. Alternatively, a separate solenoid controlled valve could be connected in parallel with the pressure relief valve.

Also provided in the cap 4 is a vent 27 and a float valve located in the chamber and consisting of a floating ball 28 held within a cage 29 is arranged to close the vent when the water reaches a predetermined level in the chamber. The vent 27 is connected to atmosphere by a vent pipe 30. As shown in FIG. 1 the exhaust and vent pipes 24, 30 are lead back to the space above the level of water in the tank 7, this arrangement being preferred since any moisture leaving the chamber by these routes is directed into the tank and does not leak out.

Figure 2:
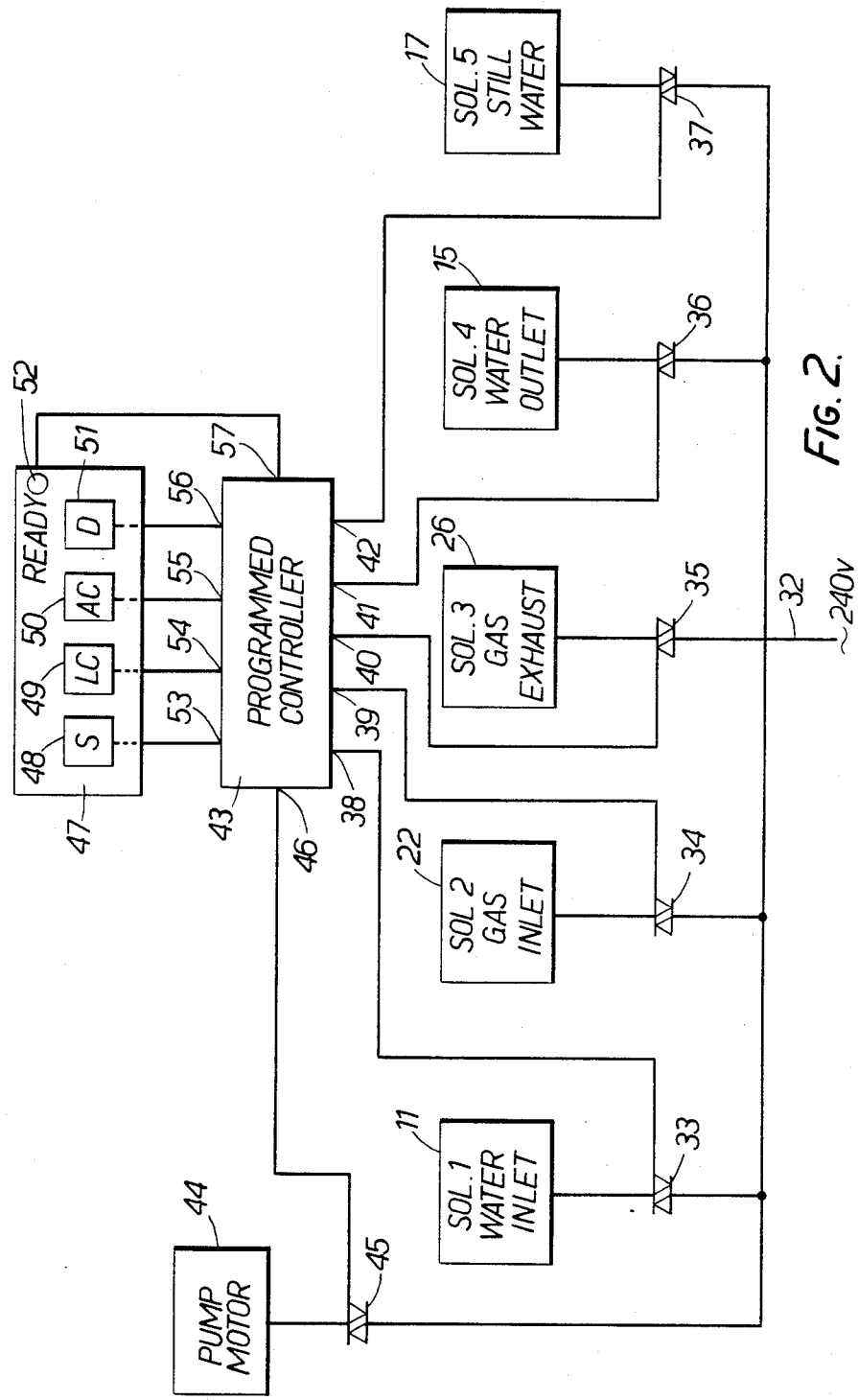
FIG. 2 shows diagrammatically the electrical control circuit of the apparatus.

As may be seen in FIG. 2 the solenoids 11, 15, 17, 22 and 26 are connected to a voltage source 32, e.g. mains voltage, through respective triac switches 33–37, the control gates of the triacs being connected to respective outputs 38–42 of a programmed timer control device 43. The motor 44 of pump 9 is also connected to the voltage source through a triac 45, the gate of which is connected to a further output 46 of the control device 43. A switch panel 47 carries four switches operated by buttons 48–50, and a signal lamp 52. The switches are connected to respective inputs 53–56 of the control device 43 and the lamp 52 is connected to a further output 57 of the control device.

The operation of the apparatus will now be described referring to both FIGS. 1 and 2. In the normal steady condition all the valves 10, 14, 16, 21 and 25 are closed, their solenoids 11, 15, 17, 22 and 26 being deactivated. A person using the machine may select either still water by pressing button 48, carbonated water with a low degree of carbonation by pressing button 49, or carbonated water with a high degree of carbonation by pressing button 50. If still water is selected the control device 43 responds to the signal at input 53 by illuminating the lamp 52 and rendering button 51 active. If the button 51 is then pressed the control device responds to the signal at input 56 and emits signals at outputs 42 and 46 whereby solenoid 17 is activated to open valve 16 and motor 44 is energised to pump still water from the tank 7 to the dispenser nozzle 12. When button 51 is released the valve 16 closes and the pump stops running. If at any time after button 48 has been pressed the button 51 remains unpressed for a predetermined time period, e.g. 15 seconds, the apparatus reverts to its normal steady condition the lamp 52 being extinguished and button 51 rendered inactive.

If carbonated water is selected the control device responds to the signal at input 54 or 55 to emit signals at outputs 38 and 46 for a predetermined time. The inlet valve 10 is opened by the activated solenoid 11 and the pump 9 is driven by the energised motor 44 to deliver water from the tank 7 into the pressure chamber through port 5. The period, e.g. about 12 seconds, for which signals are emitted at outputs 38 and 46 is sufficient for the pump 9 to substantially fill the chamber 1 with liquid. The level of water in the chamber is controlled automatically by the float valve 28, 29 which closes to prevent further escape of gas and thereby traps a volume of gas in the top of the chamber. After closing inlet valve 10 and a short delay, e.g. about one second, a signal is emitted at output 39 of the control device for activating solenoid 22 to open valve 21 for a predetermined total time. The signal at output 39 is preferably pulsed so that the gas is injected into the water through jet nozzle 18 in a series of short bursts. For example, if low carbonation has been selected the valve 21 may be opened five times each with a duration of ½ or 1 second, whereas if high carbonation has been selected the valve is opened for a greater number of times, such as 7, with the same duration of ½ or 1 second.

During injection of the gas the pressure in the chamber 1 will rise preferably to such a level that the relief valve 25 operates, but not more than a few times. When the signal from output 39 has terminated there is a fixed delay of a few, e.g. 2, seconds to allow the contents of chamber 1 to settle down before a signal is emitted at output 40 of the control device 43 to activate solenoid 26 and thereby open valve 25 for a set time to release the pressure in the chamber. After a predetermined time, e.g. 6 seconds, has elapsed from opening valve 25 the control device emits a signal at output 57 to illuminate lamp 52, and the dispense button 51 is rendered active. The control device responds to a signal at input 56 produced by pressing button 51 by emitting a signal at output 41 to activate solenoid 15 and thereby open valve 14 allowing the carbonated water to flow to the dispenser nozzle 12 under gravity. The valve 14 stays open only as long as button 51 is depressed. As the liquid level in the chamber 1 drops the float valve 28, 29 opens the vent 27 allowing air to enter the chamber 1 to replace the discharged liquid and prevent creation of a vacuum in the chamber.

The exhaust valve 25 is opened by the solenoid 26, e.g. for a period of 5 seconds, each time the dispense button is depressed, while the lamp 52 is illuminated as a precaution in case the pressure has built up in the chamber 1 since the valve 25 was last opened.

If the dispense button 51 is not pressed for a continuous period of, for example 15 seconds duration while the lamp 52 is illuminated, the control device extinguishes the lamp and renders the button 51 inactive and the whole apparatus reverts to its normal steady condition.

Modifications to the apparatus and the sequence of timed operations controlled by the control device are possible without departing from the invention.

For example, the still water selection button 48 could be omitted and the apparatus so arranged that in the normal initial condition it is set to dispense still water on pressing the dispense button 51. In this case two lamps may be provided on the control panel, one being illuminated when the apparatus is ready to dispense still water and the other being illuminated when it is ready to dispense carbonated water after pressing either button 49 or 50.

The various time periods mentioned herein above are not critical and will be adjusted to suit the apparatus.

The fully timed sequence of valve opening and closing operations achieved by means of the control device as described above has the advantage of ensuring a particularly simple control system for the carbonating apparatus. However, if desired one or more of the solenoid actuated valves could be arranged to provide a feedback signal, in a manner known per se, to the control device for said device to check that one particular step in the carbonating process had been fully completed before the next step is commenced. For example, if the pressure releasing/exhaust valve 25 failed to operate correctly so that the chamber remained pressurised, the malfunction could be detected and the outlet valve 14 prevented from being opened which would result in liquid being ejected under high pressure through the discharge nozzle. Other protection arrangements are also possible and will occur to skilled readers.

Furthermore, it is possible for the apparatus to include devices for sensing the level if liquid and/or the pressure in the chamber and providing corresponding signals to the control device either to serve as a protection system, e.g. to prevent supply of gas to the chamber if it is not filled to the correct level with water or to prevent discharge of liquid if the chamber is pressurised, or for controlling the apparatus during normal carbonation procedure, e.g. to close the inlet valve and stop the pump when a particular level of water in the chamber is reached. From the foregoing it will be understood that various alternative arrangements are possible to enable the control device to interrupt a carbonation cycle if any step is not properly performed and completed.

I claim:

1. Apparatus for carbonating liquids, comprising a carbonating chamber (1), first valve means (10,14) for controlling admission of liquid to and discharge of carbonated liquid from the chamber, a gas jet nozzle (18) mounted in the chamber for injecting carbon dioxide gas into liquid contained in the chamber, means for connecting the jet nozzle to a source of pressurised gas including second valve means (21) for controlling the supply of gas, pressure releasing means communicating with an upper part of the chamber and including third valve means (25), characterised in that said first, second and third valve means are electrically actuable and controlled by electronic control means (43) so programmed that in response to a start signal supplied to the control means, the first valve means is actuated for the admission of liquid to the chamber to substantially fill the chamber, after closure of said first valve means the said second valve means is actuated one or more times for periods of set duration for gas to be supplied to the jet nozzle and injected into the liquid, after termination of the gas supply and a short delay the said third valve means is opened to release the pressure in the chamber, and following a further short delay after opening the third valve means the first valve means may be actuated for carbonated liquid to be discharged from the chamber.

2. Apparatus according to claim 1, wherein the chamber includes liquid inlet and outlet means (5,6) at the lower end thereof, and means is provided for connecting said inlet means to a source of liquid under pressure.

3. Apparatus according to claim 2, wherein said source of liquid comprises a reservoir (7) and an electrically driven pump (9), operation of said pump being controlled by said control means for said pump to be operated while said first valve means is actuated for admitting liquid into the chamber.

4. Apparatus according to claim 2 or 3, wherein said inlet and outlet means comprises respective inlet and outlet ports (5 and 6), and said first valve means comprises separate electrically actuable liquid inlet and outlet valves (10 and 14) for controlling delivery of liquid to the inlet port and discharge of liquid through the outlet port, respectively.

5. Apparatus according to claim 1, wherein the control means comprises a timer control device and actuates the first valve means for a predetermined time for the admission of liquid to the chamber.

6. Apparatus according to claim 5, wherein a vent (27) connects an upper part of the chamber to atmosphere, a float valve (28,29) is located in the chamber and is arranged to close the vent for limiting the level of liquid in the chamber and trapping a volume of gas in the chamber, and the predetermined time of actuation of the first valve means to admit liquid to the chamber being of sufficient duration for liquid to substantially fill the chamber and close said float valve.

7. Apparatus according to claim 1, wherein said chamber is provided with exhaust outlet means (23,24) leading from an upper part of the chamber and connected to atmosphere via an exhaust valve (25), said exhaust valve being pressure responsive to limit the pressure in the chamber, and said exhaust valve constituting said third valve means and being electrically actuable to release the pressure in the chamber.

8. Apparatus as claimed in claim 1, wherein the first, second and third electrically actuable valve means comprise actuating solenoids (11,15,22,26).

9. Apparatus according to claim 8, wherein said solenoids are connected to an electrical voltage supply input (32) by respective electronic switching devices (33-37) and said control means is coupled to and controls operation of said switching devices.

10. Apparatus according to claim 1, wherein means (49,50) is provided to select the degree of carbonation by determining the number of times that said second valve means is actuated.

11. Apparatus according to claim 10, including a control unit (47) with at least two manually operable members (49,50), each member being arranged to emit a start signal to the control means in response to operation thereof, and the control means being responsive to the start signals from the respective devices to actuate the second valve means (21) for different predetermined numbers of times during the sequence of operations controlled thereby.

12. Apparatus according to claim 1, wherein actuation of said first valve means to discharge carbonated liquid from the chamber is controlled by a manually operable member (51), said member being disabled during the sequence of operations controlled by said control means.

13. Apparatus according to claim 12, wherein said third valve means (25) is actuated for a predetermined period when said discharge controlling member is operated.

14. Apparatus according to claim 1, wherein a fourth electrically actuable valve means (16) is provided and is selectively actuable for the apparatus to dispense still, uncarbonated liquid.

15. Apparatus according to claim 1, wherein one or more of the valve means is arranged to provide a feedback signal to the control means to enable said control means to check that one step in the carbonating sequence has been completed before the next step is commenced.

* * * * *